United States Patent
Seo et al.

(10) Patent No.: US 10,711,142 B2
(45) Date of Patent: Jul. 14, 2020

(54) ANTIREFLECTION FILM AND DISPLAY DEVICE

(71) Applicant: LG CHEM, LTD., Seoul (KR)

(72) Inventors: Jung Hyun Seo, Daejeon (KR); Boo Kyung Kim, Daejeon (KR); Yeong Rae Chang, Daejeon (KR); Jae Hoon Shim, Daejeon (KR); Jin Young Park, Daejeon (KR); Jae Pil Koo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 125 days.

(21) Appl. No.: 15/580,628

(22) PCT Filed: Feb. 10, 2017

(86) PCT No.: PCT/KR2017/001453
§ 371 (c)(1),
(2) Date: Dec. 7, 2017

(87) PCT Pub. No.: WO2017/159990
PCT Pub. Date: Sep. 21, 2017

(65) Prior Publication Data
US 2018/0179395 A1 Jun. 28, 2018

(30) Foreign Application Priority Data

Mar. 4, 2016 (KR) .......... 10-2016-0030396
Mar. 28, 2016 (KR) .......... 10-2016-0037209

(51) Int. Cl.
*C09D 5/00* (2006.01)
*G02B 5/02* (2006.01)
(Continued)

(52) U.S. Cl.
CPC ............. *C09D 5/006* (2013.01); *C09D 5/00* (2013.01); *C09D 7/40* (2018.01); *C09D 7/67* (2018.01);
(Continued)

(58) Field of Classification Search
None
See application file for complete search history.

(56) References Cited

U.S. PATENT DOCUMENTS

| 5,634,952 A | 6/1997 | Kasai et al. |
| 6,613,426 B2 | 9/2003 | Onozawa et al. |

(Continued)

FOREIGN PATENT DOCUMENTS

| CN | 103782203 A | 5/2014 |
| EP | 3163336 A1 | 5/2017 |

(Continued)

*Primary Examiner* — Derek S. Chapel
(74) *Attorney, Agent, or Firm* — Dentons, US LLP

(57) ABSTRACT

The present invention relates to an antireflection film which includes a hard coating layer and a low refractive index layer formed on the hard coating layer, wherein the sum of the volume of the convex portion of the peak equal to or higher than the average line is less than 0.03 mm³ in the surface area of 1.47 mm², and the sum of the volume of the concave portion of the valley equal to or lower than the average line is less than 0.03 mm³ in the surface area of 1.47 mm², and a display device comprising the antireflection film.

20 Claims, 4 Drawing Sheets

(51) Int. Cl.
*C09D 7/40* (2018.01)
*G02B 1/11* (2015.01)
*G02B 1/14* (2015.01)
*C09D 135/02* (2006.01)
*G02B 1/111* (2015.01)
*C08K 3/36* (2006.01)
*C09D 201/00* (2006.01)
*G02B 1/115* (2015.01)
*G02F 1/1335* (2006.01)

(52) U.S. Cl.
CPC .............. *C09D 7/68* (2018.01); *C09D 135/02* (2013.01); *C09D 201/00* (2013.01); *G02B 1/11* (2013.01); *G02B 1/111* (2013.01); *G02B 1/115* (2013.01); *G02B 1/14* (2015.01); *G02B 5/02* (2013.01); *G02F 1/1335* (2013.01); *C08K 3/36* (2013.01); *C08K 2201/003* (2013.01); *C08K 2201/011* (2013.01)

(56) References Cited

U.S. PATENT DOCUMENTS

| | | | |
|---|---|---|---|
| 7,645,502 B2 * | 1/2010 | Mikami | G02B 1/111 349/137 |
| 8,047,662 B2 | 11/2011 | Suzuki et al. | |
| 8,081,281 B2 | 12/2011 | Matsunaga et al. | |
| 8,256,908 B2 | 9/2012 | Inoue et al. | |
| 8,309,202 B2 | 11/2012 | Kojima et al. | |
| 9,207,370 B2 | 12/2015 | Eguchi et al. | |
| 9,297,933 B2 | 3/2016 | Kuroda et al. | |
| 9,500,777 B2 | 11/2016 | Ibuki et al. | |
| 9,606,267 B2 | 3/2017 | Yang et al. | |
| 9,696,463 B2 | 7/2017 | Honda et al. | |
| 9,753,189 B2 | 9/2017 | Sanari et al. | |
| 2006/0093809 A1 | 5/2006 | Hebrink et al. | |
| 2006/0188664 A1 * | 8/2006 | Ando | C09D 183/04 428/1.1 |
| 2008/0030861 A1 * | 2/2008 | Ookubo | C08J 7/047 359/601 |
| 2010/0028600 A1 | 2/2010 | Kojima et al. | |
| 2010/0079869 A1 | 4/2010 | Inoue et al. | |
| 2010/0328776 A1 | 12/2010 | Sanari et al. | |
| 2011/0080643 A1 | 4/2011 | Niinou et al. | |
| 2011/0157704 A1 | 6/2011 | Sato et al. | |
| 2013/0215514 A1 | 8/2013 | Kim et al. | |
| 2013/0250414 A1 | 9/2013 | Eguchi et al. | |
| 2017/0131439 A1 * | 5/2017 | Kobori | G02F 1/133502 |
| 2018/0223113 A1 * | 8/2018 | Seo | C09D 7/61 |
| 2018/0230317 A1 * | 8/2018 | Seo | C09D 5/00 |
| 2018/0313978 A1 * | 11/2018 | Chang | C09D 4/00 |

FOREIGN PATENT DOCUMENTS

| | | |
|---|---|---|
| JP | 2003034761 A | 2/2003 |
| JP | 2006-047504 A | 2/2006 |
| JP | 2009-042351 A | 2/2009 |
| JP | 2009-204728 A | 9/2009 |
| JP | 2009-276738 A | 11/2009 |
| JP | 2009276658 A | 11/2009 |
| JP | 2009-288732 A | 12/2009 |
| JP | 2010-201773 A | 9/2010 |
| JP | 2010-254950 A | 11/2010 |
| JP | 2012-128064 A | 7/2012 |
| JP | 2013178534 A | 9/2013 |
| JP | 2015-031794 A | 2/2015 |
| KR | 10-2005-0020722 A | 3/2005 |
| KR | 10-2014-0140139 A | 12/2014 |
| KR | 10-2016-0002407 A | 1/2016 |
| WO | 2013099931 A1 | 7/2013 |
| WO | 2016-030738 A1 | 3/2016 |

* cited by examiner

[FIG. 1a]
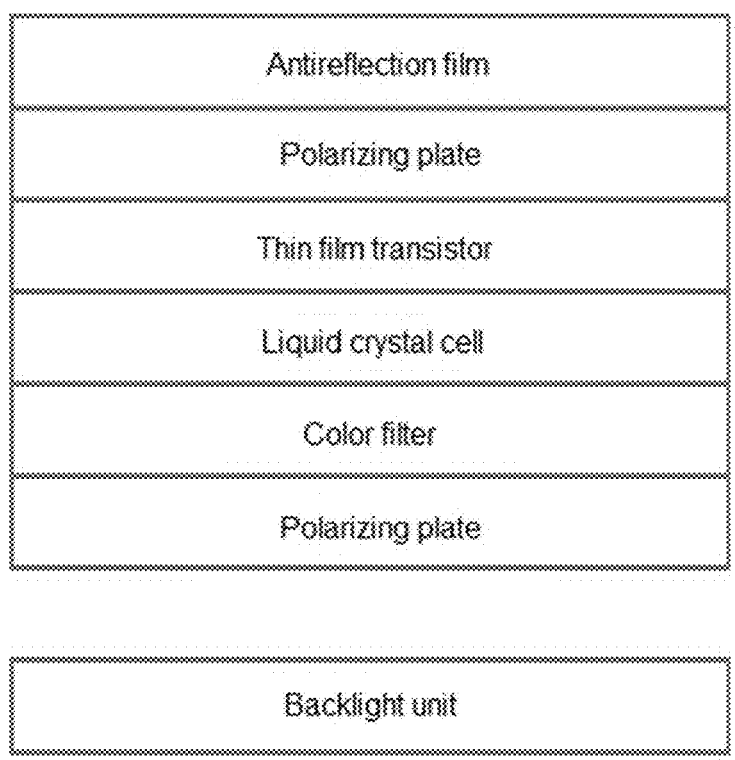

[FIG. 1b]
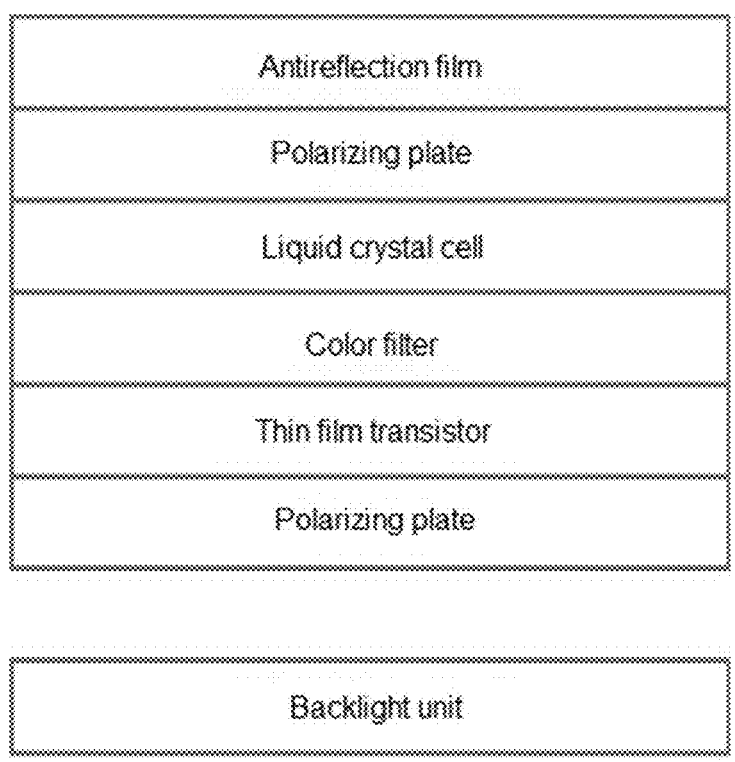

[FIG. 2]
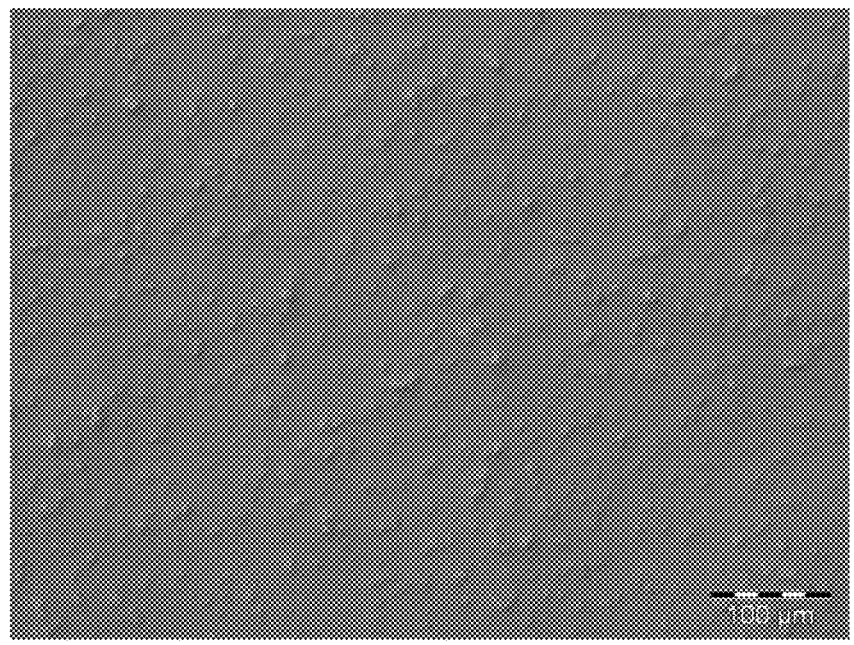

[FIG. 3]
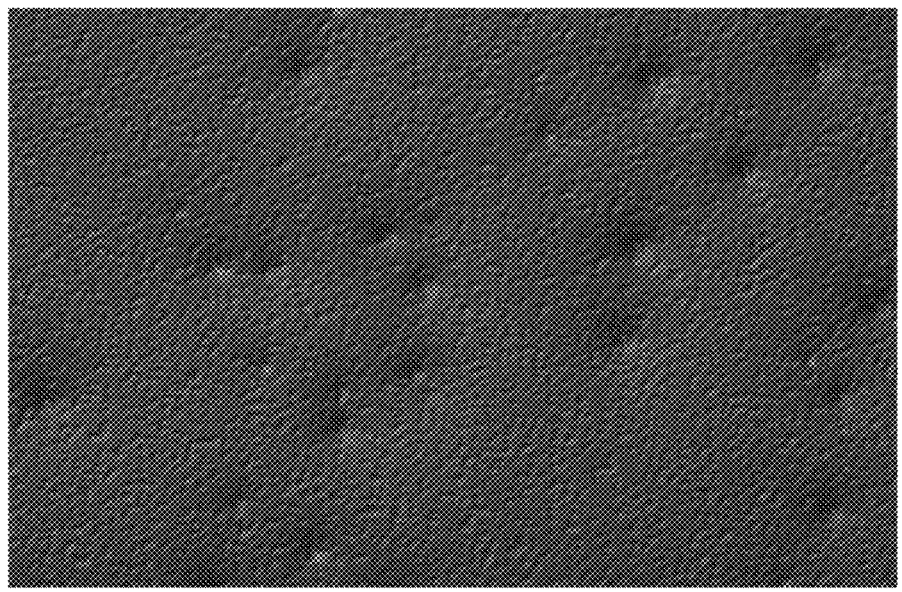

ANTIREFLECTION FILM AND DISPLAY DEVICE

CROSS-REFERENCE TO RELATED APPLICATION(S)

This application is a National Stage Application of International Application No. PCT/KR2017/001453 filed on Feb. 10, 2017, which claims the benefit of Korean Patent Application No. 10-2016-0030396 filed on Mar. 14, 2016 and Korean Patent Application No. 10-2016-0037209 filed on Mar. 28, 2016, all of which are hereby incorporated by reference in their entirety for all purposes as if fully set forth herein.

TECHNICAL FIELD

The present invention relates to an antireflection film and a display device. More specifically, the present invention relates to an antireflection film having reduced sparkling phenomenon and excellent visibility when applied to a high-resolution display and having excellent workability during the production of a display, and a display device providing optical characteristics such as excellent external black visibility and contrast ratio, etc., and high screen sharpness.

BACKGROUND OF ART

In general, a flat panel display device such as a PDP or a LCD is equipped with an antireflection film for minimizing the reflection of light incident from the outside.

As a method for minimizing the reflection of light, there exist a method (anti-glare: AG coating) in which a filler such as an inorganic fine particle is dispersed in a resin and coated on a substrate film to impart irregularities; a method (anti-reflection: AR coating) of using the interference of light by forming a plurality of layers having different refractive indexes on a substrate film; or a method for mixing them, etc.

Among them, in the case of the AG coating, the absolute amount of the reflected light is equivalent to that of a general hard coating, but a low reflection effect can be obtained by reducing the amount of light entering the eye using light scattering through irregularities. However, since the AG coating has poor surface sharpness due to the surface irregularities, many studies on AR coating have been conducted recently.

As for a film using the AR coating, a multi-layer structure in which a hard coating layer (high refractive index layer), a low reflective coating layer, and the like are laminated on a substrate film has been commercialized. However, in the case of a clear coating having no irregularities on the surface, there are disadvantages in that the anti-glare effect is not sufficient and a defect inside the display is easily visible.

Accordingly, many studies have been actively conducted to minimize the reflection of light incident from the outside while maintaining the sharpness of the image. However, as the resolution of the display increases, the degree of improvement of the physical properties is insufficient. Recently, there are cases in which a COT (color filter on TFT) structure is used as a liquid crystal panel of a liquid crystal display device.

When a liquid crystal panel having such a COT structure is used, the reflectivity of the inside of the panel is increased due to the metals included in the electrodes and the like, and thus the optical characteristics of the display such as external black visibility and contrast ratio are reduced. Accordingly, there is a need to develop a surface coating film having an excellent antireflection function while increasing the yield of the display panel.

DETAILED DESCRIPTION OF THE INVENTION

Technical Problem

It is an object of the present invention to provide an antireflection film having reduced sparkling phenomenon and excellent visibility when applied to a high-resolution display and having excellent workability during the production of a display.

Further, it is another object of the present invention to provide a display device providing optical characteristics such as excellent external black visibility and contrast ratio, etc., and high screen sharpness.

Technical Solution

In order to achieve the above objects, the present invention provides an antireflection film comprising a hard coating layer and a low refractive index layer formed on the hard coating layer, wherein the sum of the volume of the convex portion of the peak equal to or higher than the average line is less than $0.03$ mm$^3$ in the surface area of $1.47$ mm$^2$, and the sum of the volume of the concave portion of the valley equal to or lower than the average line is less than $0.03$ mm$^3$ in the surface area of $1.47$ mm$^2$.

Further, in the present invention, there may be provided a display device including the antireflection film described above.

Hereinafter, the antireflection film and the display device according to specific embodiments of the present invention will be described in more detail.

In the present specification, a photopolymerizable compound collectively refers to a compound which causes a polymerization reaction when irradiated with a light, for example, when irradiated with a visible light or ultraviolet light.

Further, a fluorine-based compound refers to a compound containing at least one fluorine element in the compound.

Further, a (meth)acryl may include both acryl and methacryl.

Furthermore, a (co)polymer may include both a co-polymer and a homo-polymer.

Moreover, hollow silica particles refer to silica particles derived from a silicon compound or an organosilicon compound, in which voids are present on the surface and/or inside of the silica particles.

According to one embodiment of the present invention, there may be provided an antireflection film comprising a hard coating layer and a low refractive index layer formed on the hard coating layer, wherein the sum of the volume of the convex portion of the peak equal to or higher than the average line of the antireflection film surface is less than $0.03$ mm$^3$ in the surface area of $1.47$ mm$^2$, and the sum of the volume of the concave portion of the valley equal to or lower than the average line is less than $0.03$ mm$^3$ in the surface area of $1.47$ mm$^2$.

Herein, the "convex portion of the peak" refers to a convex portion that is protruded upward in the concavo-convex shape on the surface of the antireflection film, and the "concave portion of the valley" refers to a concave portion that is recessed downward in the concavo-convex shape on the surface of the antireflection film.

The hard coating layer may be composed of a coating layer having fine irregularities on one surface thereof, which is usually referred to as an AG coating layer. Specifically, the surface of the hard coating layer has a concavo-convex structure having a height of several hundred nm to several μm. The film on which the concavo-convex structure is formed has excellent anti-glare effect because it may induce a diffused reflection when a light enters from the outside, but an image that comes out from the inside is distorted on the surface, thereby causing a problem of decreasing the sharpness and resolution of the image. In addition, a high-resolution display of UHD (ultrahigh definition) or higher has a severe image distortion, and thus, it is necessary to control the concavo-convex structure.

Accordingly, the present inventors have conducted studies on the parameters that can effectively analyze the surface concavo-convex structure of the antireflection film in order to obtain an optimum surface concavo-convex structure capable of simultaneously implementing the antireflection effect and visibility. As a result, the inventors have found through experiments that the surface concavo-convex structure can be easily understood through the sum of the volume of the convex portion of the peak of the average line or above and the concave portion of the valley of the average line or below per surface area of the predetermined range of the antireflection film, thereby completing the present invention. In particular, the parameter for the volume occupied by the convex portion of the peak and by the concave portion of the valley of the surface irregularities of the antireflection film is useful when the height of the surface irregularities is lower than the height parameter of the surface irregularities.

Specifically, the volume parameter may be particularly useful for understanding the surface concavo-convex structure of the antireflection film when the 10-point average roughness (Rz) of the surface concavo-convex structure is 0.2 μm or less. For example, since the decrease in the average roughness (Rz) value indicates a decrease in the height of the surface concavo-convex shape, the smaller the value of the average roughness (Rz), the smaller the difference between the irregularities having the maximum height and the irregularities having the minimum height, and thus, it may be difficult to understand the shape of the irregularities only by the height thereof.

Accordingly, the present inventors have repeatedly conducted studies on the antireflection film having a concavo-convex shape with low height, and as a result, found that, even if the irregularities have the same height, there exists a difference in the anti-glare function of the film depending on the size, number and shape of the irregularities, and therefore, the volume parameter, which is a three-dimensional variable having the information on the height and shape of the irregularities simultaneously, is more appropriate than the height parameter such as the average roughness (Rz) as the parameter representing the same.

In addition, it was confirmed that when the peaks and valleys of the surface irregularities of the antireflection film have a volume in the specific range, it enables the implementation of the antireflection film which reduces the reflectivity caused by a low refractive index layer and has excellent anti-glare effect and visibility.

Specifically, the volume occupied by the convex portion of the peak equal to or higher than the average line in the surface area of 1.47 mm² of the antireflection film may be less than 0.03 mm³, or 0.001 to 0.03 mm³, or 0.01 to 0.03 mm³. Further, the volume occupied by the concave portion of the valley equal to or lower than the average line in the surface area of 1.47 mm² of the antireflection film may be less than 0.03 mm³, or 0.001 to 0.03 mm³, or 0.01 to 0.03 mm³.

The sum of the volume of the convex portion of the peak equal to or higher than the average line in the surface area of 1.47 mm² of the antireflection film refers to the sum of the portions occupied by the convex portion having a height equal to or higher than the average line within the arbitrarily set measurement surface area, and the sum of the volume of the concave portion of the valley equal to or lower than the average line in the surface area of 1.47 mm² of the antireflection film refers to the sum of the portions occupied by the concave portion having a height equal to or lower than the average line within the arbitrarily set measurement surface area.

Herein, the 'average line' refers to, when the surface is cut in a plane perpendicular to the surface of the antireflection film, a value of peak height at which the sum of the area of the peak and the sum of the area of the valley are calculated in the same manner, after a portion shorter than a predetermined wavelength has been removed by a phase-compensation low-pass filter in a curve appearing in the cross-section. The surface area of 1.47 mm² may be set by controlling the length of the horizontal line and/or the length of the vertical line, for example, it may be set to 1.40 mm×1.05 mm.

The sum of the volume of the convex portion of the peak equal to or higher than the average line and the sum of the volume of the concave portion of the valley equal to or lower than the average line may be measured by a non-contact surface shape measuring instrument (3D optical profiler). Specifically, since the antireflection film includes a low refractive index layer formed on the hard coating layer, the sum of the volume of the convex portion of the peak equal to or higher than the average line or and the sum of the volume of the concave portion of the valley equal to or lower than the average line of the surface of the antireflection film may be obtained relative to the surface of the low refractive index layer.

Herein, as the sum of the volume of the convex portion of the peak equal to or higher than the average line or the concave portion of the valley equal to or lower than the average in the surface area of 1.47 mm² of the antireflection film is each in the range of greater than 0 and less than 0.03 mm³, the external reflection may be reduced while minimizing the external irregularities of the surface.

If the sum of the volume of the convex portion of the peak equal to or higher than the average line or the concave portion of the valley equal to or lower than the average in the surface area of 1.47 mm² of the antireflection film is 0, there may be a problem of poor hiding power as no anti-glare effect function exists, and if the sum of the volume of the convex portion of the peak equal to or higher than the average line or the concave portion of the valley equal to or lower than the average in the surface area of 1.47 mm² of the hard coating layer is greater than or equal to 0.03 mm³, the visibility of the film may be deteriorated due to having an hiding power higher than what is needed.

Therefore, an antireflection film, in which the sum of the volume of the convex portion of the peak equal to or higher than the average is less than 0.03 mm³, and at the same time, the sum of the volume of the concave portion of the valley equal to or lower than the average line is less than 0.03 mm³ in the surface area of 1.47 mm², may exhibit an excellent antireflection function and visibility at the same time.

Furthermore, the antireflection film shows mechanical properties such as excellent wear resistance, abrasion resistance, or scratch resistance, etc., and these properties may be implemented by the characteristics of the external irregularities according to the coating of a hard coating layer and a low refractive index layer and the characteristics of a composition forming the low refractive index layer. The details of the composition of the low refractive index layer will be described later.

In addition, in order to improve the hiding power of panel defects while maintaining the visibility of the antireflection film, it is possible to impart haze to the antireflection film. The total haze of the antireflection film is defined as a sum of an internal haze and an external haze, the total haze may be obtained by measuring haze relative to the antireflection film itself. The internal haze may be measured by attaching an adhesive having a haze value of 0 to the surface to form a planarization layer or by coating a planarization layer on a surface having an alkaline treatment, and the external haze value may be defined as the total haze and the internal haze value are defined.

Specifically, when the internal haze of the antireflection film is greater than 0 and less than 10%, the hiding power of a panel defect may be improved while maintaining the sharpness. When the internal haze of the antireflection film is 0%, the hiding power of the panel may be decreased, and when the internal haze of the antireflection film is 10% or higher, it may cause a decrease in the visibility, such as a decrease in the contrast ratio.

Further, when the external haze of the antireflection film is greater than 0% and less than 0.5%, or higher than 0 and equal to or lower than 0.2%, an antireflection film having reduced sparkling phenomenon and a high resolution may be prepared. When the external haze of the antireflection film is 0%, a low reflection effect cannot be expected, and when the external haze of the antireflection film is equal to or higher than 0.5%, it may cause a decrease in the resolution. The external haze in the range mentioned above may be implemented by the surface irregularities composed of the convex portion of the peak equal to or higher than the average line which has a total volume of less than 0.03 mm$^3$ and the concave portion of the valley equal to or lower than the average line which has a total volume of less than 0.03 mm$^3$ in the surface area of 1.47 mm$^2$.

As described above, the antireflection film may have the sum of the volume of the convex portion of the peak equal to or higher than the average line of less than 0.03 mm$^3$, the sum of the volume of the concave portion of the valley equal to or lower than the average line of less than 0.03 mm$^3$ in the surface area of 1.47 mm$^2$, may have an internal haze of greater than 0 and less than 10% and an external haze of greater than 0 and less than 1%, and may exhibit an average reflectivity of less than 5% in the wavelength region of 380 nm to 780 nm. Specifically, the average reflectivity of the antireflection film may be equal to or lower than 3.5% or equal to or lower than 2.0%, or equal to or lower than 1.5% in the wavelength region of 380 nm to 780 nm. Thus, the antireflection film may maximize the antireflection function and inhibit a decrease in visibility caused by an external light in a COT panel, etc.

The sum of the volume of the convex portion of the peak equal to or higher than the average line and the sum of the volume of the concave portion of the valley equal to or lower than the average line of the antireflection film, reflectivity, internal haze, and external haze may be controlled by the composition of a hard coating composition for forming a hard coating layer of the antireflection film and a formation method thereof, and may also be influenced by the composition of a composition for forming a low refractive index layer corresponding to the surface of the antireflection film and a formation method thereof. Although most of the irregularities on the surface of the antireflection film are displayed by reflecting the concavo-convex shape of the hard coating layer, the height and shape of the irregularities on the surface of the antireflection film may be varied even by the low refractive index layer, and thus, it is preferable to appropriately control the height and shape of the irregularities of the coating layer in consideration of the change in the irregularities caused by the low refractive index layer.

Specifically, the antireflection film in which the sum of the volume of the convex portion of the peak equal to or higher than the average line is less than 0.03 mm$^3$ and the sum of the volume of the concave portion of the valley equal to or lower than the average line is less than 0.03 mm$^3$ in the surface area of 1.47 mm$^2$ may be implemented by adjusting the aggregation of particles to a desired level by changing the size and amount of each of organic particles and inorganic particles in the composition forming the hard coating layer, the ratio between the organic particles and the inorganic particles, and the ratio between the organic particles and the binder, etc.

For example, the height of the irregularities may be lowered by decreasing the aggregation of particles by decreasing the amount of organic particles and inorganic particles in the composition. Alternatively, the aggregation of the particles may be prevented by using the organic particles having excellent dispersibility than the aggregation of the particles, thereby lowing the height of the concavo-convex shape. Herein, when an appropriate amount of the inorganic particles is added together, the dispersibility of the organic particles may be controlled by the difference in polarity between the surface treatment agent of the inorganic particles and the surface treatment agent of the organic particles, and accordingly, the size and shape of the surface irregularities may be controlled as the degree of aggregation of the particles is changed.

In addition, the antireflection film in which the sum of the volume of the convex portion of the peak equal to or higher than the average line is less than 0.03 mm$^3$ and the sum of the volume of the concave portion of the valley equal to or lower than the average line is less than 0.03 mm$^3$ in the surface area of 1.47 mm$^2$ may be implemented by controlling the thickness of the hard coating layer and/or the low refractive index layer even if a composition having the same composition is used.

Specifically, as the thickness of the hard coating layer and/or the low refractive index layer increases, the surface irregularities according to the particles may be embedded in the coating layer, and thus the height of the surface irregularities may be lowered. When the thickness of the hard coating layer and/or the low refractive index layer increases, the thickness of these layers becomes thicker than the size of the organic particles or the inorganic particles. Thus, even when protrusions having a large aggregation of particles are formed, they are not prominently considered as irregularities on the surface, and accordingly, they may appear as irregularities having a low height.

As such, by adjusting the composition for forming the hard coating layer and/or the low refractive index layer and the process conditions for forming the same, the volume parameter of the concavo-convex shape on the surface, reflectivity, internal haze, and external haze of the antireflection film may be adjusted within a specific range.

On the other hand, the hard coating layer may be formed from a hard coating composition including a photopolymerizable compound, a photoinitiator, and organic fine particles or inorganic fine particles. Specifically, the hard coating layer may include a binder resin containing a (co)polymer of a photopolymerizable compound and organic or inorganic fine particles dispersed in the binder resin.

The photopolymerizable compound included in the hard coating composition for forming the hard coating layer may be a photopolymerizable/photocurable compound capable of causing a polymerization reaction when irradiated with light such as ultraviolet rays, and may be conventional ones in the art.

Specifically, the (co)polymer of the photopolymerizable compound included in the hard coating layer may be a (co)polymer formed from at least one selected from a reactive acrylate oligomer group consisting of a urethane acrylate oligomer, epoxide acrylate oligomer, polyester acrylate, and polyether acrylate; and a polyfunctional acrylate monomer group consisting of dipentaerythritol hexaacrylate, dipentaerythritol hydroxy pentaacrylate, pentaerythritol tetraacrylate, pentaerythritol triacrylate, trimethylene propyl triacrylate, propoxylated glycerol triacrylate, trimethylpropane ethoxy triacrylate, 1,6-hexanediol diacrylate, propoxylated glycerol triacrylate, tripropylene glycol diacrylate, and ethylene glycol diacrylate Further, the (co)polymer of the photopolymerizable compound may further include a high molecular weight (co)polymer having a weight-average molecular weight of 10,000 or higher. Herein, the high molecular weight (co)polymer may be at least one selected from the group consisting of cellulose-based polymers, acryl-based polymers, styrene-based polymers, epoxide-based polymers, nylon-based polymers, urethane-based polymers, and polyolefin polymers.

The hard coating layer contains organic or inorganic fine particles together with the (co)polymer of the photopolymerizable compound to impart surface irregularities and internal haze. The organic or inorganic fine particles may be spherical particles having a particle diameter of 0.5 to 10 µm or 0.5 to 5 µm, preferably 1 to 5 µm.

The particle diameter of the organic or inorganic fine particles may be equal to or higher than 0.5 µm to express the surface irregularities and internal haze, and may be equal to or lower than 10 µm in terms of the haze or thickness of the coatings. For example, when the particle size of the fine particles is excessively increased to exceed 10 µm, the thickness of the coating must be increased in order to complement the fine surface irregularities, and accordingly, the crack resistance of the film may be reduced and the film may be bent, which may be problematic.

Specific examples of the organic or inorganic fine particles are not limited, but for example, the organic and inorganic fine particles may be organic fine particles consisting of a (meth)acryl-based resin, styrene-based resin, epoxy resin, and nylon resin, or may be inorganic fine particles consisting of silicon oxide, titanium dioxide, indium oxide, tin oxide, zirconium oxide, and zinc oxide.

The hard coating layer may contain 0.1 to 20 parts by weight or 1 to 15 parts by weight, preferably 1 to 10 parts by weight of the organic or inorganic fine particles based on 100 parts by weight of the (co)polymer of the photopolymerizable compound.

When the organic or inorganic fine particles are contained in an amount of less than 0.1 part by weight based on 100 parts by weight of the (co)polymer of the photopolymerizable compound, the haze value according to the internal scattering may not be sufficiently implemented. In contrast, when the amount of the organic or inorganic fine particles exceeds 20 parts by weight based on 100 parts by weight of the (co)polymer of the photopolymerizable compound, the contrast ratio may be decreased as the haze of the coating layer is high, and a poor coating property may be observed as the viscosity of the coating composition is increased.

Further, the refractive index of the organic or inorganic fine particles is different from the refractive index of a photocurable resin forming a matrix. An appropriate difference in refractive index is determined according to the content of the particles, and it is preferable to have the refractive index difference of 0.01 to 0.5. When the difference in the refractive index between the fine particles and the photocurable resin is less than 0.01, it may be difficult to obtain an appropriate haze value. In contrast, when the difference in the refractive index between the fine particles and the photocurable resin exceeds 0.5, a desired level of surface concavo-convex shape cannot be obtained because there is a case where a very small amount of the particles must be used.

Specifically, the organic and inorganic fine particles may be at least one selected from an organic fine particle group consisting of a (meth)acryl-based resin, styrene-based resin, epoxy resin, nylon resin, and a copolymer resin thereof; and inorganic fine particle group consisting of silicon oxide, titanium dioxide, indium oxide, tin oxide, zirconium oxide, and zinc oxide.

More specifically, the organic fine particles may be at least one selected from the group consisting of methyl (meth)acrylate, ethyl (meth)acrylate, propyl (meth)acrylate, n-butyl (meth)acrylate, isobutyl (meth)acrylate, t-butyl (meth)acrylate, 2-ethylhexyl (meth)acrylate, n-octyl (meth)acrylate, lauryl (meth)acrylate, stearyl (meth)acrylate, 2-hydroxyethyl (meth)acrylate, polyethylene glycol (meth)acrylate, methoxypolyethylene glycol (meth)acrylate, glycidyl (meth)acrylate, dimethylaminoethyl (meth)acrylate, diethylaminoethyl (meth)acrylate, styrene, p-methylstyrene, m-methylstyrene, p-ethylstyrene, m-ethylstyrene, p-chlorostyrene, m-chlorostyrene, p-chloromethylstyrene, m-chloromethylstyrene, styrenesulfonic acid, p-t-butoxystyrene, m-t-butoxystyrene, vinyl acetate, vinyl propionate, vinyl butyrate, vinyl ether, allyl butyl ether, allyl glycityl ether, (meth)acrylic acid, maleic acid, unsaturated carboxylic acid, alkyl (meth)acrylamide, (meth)acrylonitrile, and (meth) acrylate.

Further, as for the organic fine particles, one single substance selected from the group consisting of polystyrene, polymethyl methacrylate, polymethyl acrylate, polyacrylate, polyacrylate-co-styrene, polymethyl acrylate-co-styrene, polymethyl methacrylate-co-styrene, polycarbonate, polyvinyl chloride, polybutylene terephthalate, polyethylene terephthalate, polyamide type, polyimide type, polysulfone, polyphenylene oxide, polyacetal, epoxy resin, phenol resin, silicone resin, melamine resin, benzoguanamine, polydivinylbenzene, polydivinylbenzene-co-styrene, polydivinylbenzene-co-acrylate, polydialkyl phthalate, and triallyl isocyanurate polymer, or a copolymer of two or more thereof may be used, but is not limited thereto.

Meanwhile, the hard coating layer may further include inorganic nanoparticles having a diameter of 1 nm to 50 nm. A predetermined functional group or compound may be bonded to the surface of the inorganic nanoparticle. The inorganic nanoparticles may exist on the surface of the organic or inorganic fine particles or may exist alone, and may smoothly control the shape of the surface irregularities of the hard coating layer and improve the mechanical characteristics of the coating layer. Specific examples of the inorganic nanoparticles include silicon oxide (silica), alumina, titania, etc.

Herein, the hard coating layer may further include inorganic nanoparticles having a diameter of greater than 50 nm and 120 nm or less. Accordingly, the hard coating layer may only include inorganic nanoparticles having a diameter of 1 nm to 50 nm, or may include both the inorganic nanoparticles having a diameter of 1 nm to 50 nm, and the inorganic nanoparticles having a diameter of greater than 50 nm and 120 nm or less, as inorganic nanoparticles. For example, the inorganic nanoparticles may be contained in the hard coating layer in an amount of 10 parts by weight or less based on 100 parts by weight of the (co)polymer of the photopolymerizable compound.

Furthermore, the hard coating layer may contain 3 to 10% by weight or 4 to 10% by weight, or 5 to 10% by weight of the inorganic nanoparticles having a diameter of 1 nm to 50 nm based on the total weight of the organic or inorganic fine particles and the inorganic nanoparticles.

When the inorganic nanoparticles having a diameter of 1 nm to 50 nm in the hard coating layer are adjusted to the above range, as a sufficient haze value according to the internal scattering is implemented, the degree of aggregation of the particles is controlled at the same time, thereby enabling the implementation of irregularities having a desired height and shape, and accordingly the volume parameter of the antireflection film may be controlled.

For example, when the content of the inorganic nanoparticles having a diameter of 1 nm to 50 nm is lower than 3% by weight, the size of the aggregates is not controlled, and thus, defective pixels may occur or the black contrast ratio may be decreased when applied to a display. In contrast, when the content of the inorganic nanoparticles having a diameter of 1 nm to 50 nm is higher than 10% by weight, the internal scattering effect may be unevenly expressed, and defective pixels may occur when applied to a display as the size of aggregation of the particles is not uniform.

The hard coating composition for forming the hard coating layer may include a photoinitiator, and as for the photoinitiator, any photoinitiators conventionally known in the art may be used without particular limitation. Examples of the photoinitiator include one single substance or a mixture of two or more selected from 1-hydroxycyclohexyl phenyl ketone, benzyl dimethyl ketal, hydroxydimethyl acetophenone, benzoin, benzoin methyl ether, benzoin ethyl ether, benzoin isopropyl ether, and benzoin butyl ether, but the present invention is not limited by the examples described above.

Herein, the photoinitiator may be added in an amount of 0.1 to 10 parts by weight based on 100 parts by weight of the photopolymerizable compound. When the photoinitiator is contained in an amount of less than 0.1 part by weight based on 100 parts by weight of the photopolymerizable compound, a photocuring according to ultraviolet irradiation may not occur sufficiently. In contrast, when the photoinitiator is contained in an amount of exceeding 10 part by weight based on 100 parts by weight of the photopolymerizable compound, the film strength of the finally formed antireflection film may be decreased, and the adhesion with the low refractive index layer on the hard coating layer may be reduced.

On the other hand, the hard coating composition forming the hard coating layer may further include an organic solvent. When such an organic solvent is added, there is no limitation in its composition. However, considering ensuring of appropriate viscosity of the coating composition and the film strength of the finally formed film, the organic solvent may be used in an amount of preferably 50 to 700 parts by weight, more preferably 100 to 500 parts by weight, and most preferably 150 to 450 parts by weight based on 100 parts by weight of the photocurable resin.

Herein, the type of the organic solvent that can be used is not limited in its constitution, but at least one type or one mixture selected from the group consisting of lower alcohols having 1 to 6 carbon atoms, acetates, ketones, cellosolve, dimethylformamide, tetrahydrofuran, propylene glycol monomethyl ether, and xylene may be used.

Herein, examples of the lower alcohols include methanol, ethanol, isopropyl alcohol, butyl alcohol, isobutyl alcohol, or diacetone alcohol, but are not limited thereto. Further, as for the acetates, methyl acetate, ethyl acetate, isopropyl acetate, butyl acetate, or cellosolve acetate may be used, and as for the ketones, methyl ethyl ketone, methyl isobutyl ketone, acetylacetone, or acetone may be used, but are not limited to the examples described above.

On the other hand, the hard coating composition for forming the hard coating layer may further include at least one additive selected from the group consisting of a leveling agent, a wetting agent, and a defoaming agent. Herein, the additives may be each added in an amount of 0.01 to 10 parts by weight based on 100 parts by weight of the photopolymerizable compound.

The leveling agent serves to uniformize the surface of a coating film coated using the hard coating composition. Further, as the wetting agent serves to lower the surface energy of the hard coating composition, it helps to achieve a uniform coating when coating the hard coating composition on a transparent substrate layer.

Herein, the defoaming agent may be added to remove bubbles in the hard coating composition.

Additionally, the leveling agent, wetting agent, and defoaming agent may affect the dispersibility of the fine particles or nanoparticles of the hard coating composition and the formation of irregularities.

On the other hand, the low refractive index layer may be formed from a photocurable coating composition for producing a low refractive index layer including a photopolymerizable compound; an inorganic fine particle; a polysilsesquioxane in which at least one reactive functional group is substituted; a fluorine-based compound containing a photoreactive functional group; and a photopolymerization initiator. Specifically, the low refractive index layer may include a binder resin including a cross-linked polymer between a photopolymerizable compound; a fluorine-based compound containing a photoreactive functional group; and a polysilsesquioxane in which at least one reactive functional group is substituted, and an inorganic fine particle dispersed in the binder resin.

Herein, the low refractive index layer may contain 0.5 to 25 parts by weight of the polysilsesquioxane having at least one reactive functional group substituted therein based on 100 parts by weight of the photopolymerizable compound.

When a photocurable coating composition including the polysilsesquioxane having at least one reactive functional group substituted therein in a specific amount is used, an antireflection film which can implement low reflectivity and high light transmittance and can exhibit excellent mechanical properties while improving the sharpness of the screen of a low refractive index layer and a display device capable of improving alkali resistance and simultaneously ensuring excellent abrasion resistance or scratch resistance.

In the past, a method of adding various particles in the size of nanometers (for example, particles of silica, alumina, zeolite, etc.) had been mainly attempted to improve the scratch resistance of the low refraction layer included in the antireflection film. However, according to this method, the scratch resistance could be secured to a certain extent, but not only the nanometer sized particles showed a low surface treatment rate, but also there was a limitation in that the alkali resistance was significantly reduced with an increase in the specific surface area exposed to the pretreatment solution due to the small size.

On the contrary, the photocurable coating composition of the one embodiment includes 0.5 to 25 parts by weight or 1.5 to 19 parts by weight of the polysilsesquioxane having at least one reactive functional groups substituted therein based on 100 parts by weight of the photopolymerizable compound, thereby providing a low refractive index layer capable of simultaneously implementing a high alkali resistance and scratch resistance while having low reflectivity and high light transmittance, and further, the performance and quality of a finally manufactured antireflection film or a display device to which such an antireflection film is applied may be enhanced.

Specifically, as reactive functional groups exist on the surface of the polysilsesquioxane having at least one reactive functional group substituted therein, the mechanical properties, for example, scratch resistance, of the coating film or the binder resin formed upon photocuring of the photocurable coating compositions may be enhanced. In addition, the polysilsesquioxane in which at least one reactive functional group is substituted therein may enhance the alkali resistance of the coating film or the binder resin formed upon photocuring of the photocurable coating composition since a siloxane bond (—Si—O—) is located inside the molecule, unlike in the case of using fine particles of silica, alumina, zeolite, etc. known in the past.

As described above, the photocurable coating composition includes 0.5 to 25 parts by weight or 1.5 to 19 parts by weight of the polysilsesquioxane having at least one reactive functional groups substituted therein based on 100 parts by weight of the photopolymerizable compound. Accordingly, the weight ratio of the portion derived from the polysilsesquioxane having at least one reactive functional group substituted therein relative to the portion derived from the photopolymerizable compound in the binder resin may be 0.005 to 0.25 or 0.015 to 0.19.

When the content of the polysilsesquioxane having at least one reactive functional group substituted therein relative to the photopolymerizable compound in the photocurable coating composition is too small, it may be difficult to ensure sufficient alkali resistance and scratch resistance of the coating film or the binder resin formed upon photocuring of the photocurable coating composition. In contrast, when the content of the polysilsesquioxane having at least one reactive functional group substituted therein relative to the photopolymerizable compound in the photocurable coating composition is too large, the transparency of the low refractive index layer or antireflection film manufactured from the photocurable coating composition may be decreased, and the scratch resistance may rather be decreased.

The reactive functional group substituted in the polysilsesquioxane may include at least one selected from the group consisting of alcohol, amine, carboxylic acid, epoxide, imide, (meth)acrylate, nitrile, norbornene, olefin [ally, cycloalkenyl, or vinyldimethylsilyl, etc.], polyethylene glycol, thiol, and vinyl and may preferably be epoxide or (meth)acrylate.

More specific examples of the reactive functional group include (meth) acrylates, alkyl (meth)acrylates having 1 to 20 carbon atoms, alkyl cycloalkyl epoxide having 3 to 20 carbon atoms, and cycloalkane epoxide having 1 to 10 carbon atoms.

The alkyl (meth)acrylate means that the other part of 'alkyl' that is not bonded to (meth)acrylate is a boding position, the cycloalkyl epoxide means that the other part of 'cycloalkyl' that is not bonded to an epoxide is a bonding position, and the alkyl cycloalkane epoxide means that the other part of 'alkyl' that is not bonded to a cycloalkane epoxide is a bonding position.

On the other hand, the polysilsesquioxane in which at least one reactive functional group is substituted therein may further include at least one unreactive functional group selected from the group consisting of a linear or branched alkyl group having 1 to 30 carbon atoms, a cyclohexyl group having 6 to 30 carbon atoms, and an aryl group having 6 to 30 carbon atoms, in addition to the above-described reactive functional group. Thus, as the reactive functional groups and the unreactive functional groups are surface-substituted in the polysilsesquioxane, the siloxane bond (—Si—O—) in the polysilsesquioxane in which at least one reactive functional group is substituted therein is located inside the molecule and is not exposed to the outside, thereby further enhancing the alkali resistance of the coating film or the binder resin formed upon photocuring of the photocurable coating composition. Particularly, when the unreactive functional group introduced into the polysilsesquioxane together with the reactive functional group is a linear or branched alkyl group having 6 or more carbon atoms or 6 to 30 carbon atoms, or a cyclohexyl group having 6 to 30 carbon atoms, the effect of improving the alkali resistance of the coating film or the binder resin is much more higher.

On the other hand, the polysilsesquioxane may be represented by $(RSiO_{1.5})_n$ (where n is 4 to 30 or 8 to 20), and may have various structures such as random, ladder type, cage and partial cage, etc.

However, in order to enhance the physical properties and quality of the low refractive index layer and antireflection film manufactured from the photocurable coating composition of the one embodiment, a polyhedral oligomeric silsesquioxane having a cage structure, in which at least one reactive functional group is substituted, may be used as the polysilsesquioxan in which at least one reactive group is substituted.

Further, more preferably, the polyhedral oligomeric silsesquioxane having a cage structure, in which at least one functional group substituted therein, may include 8 to 20 silicon atoms in a molecule.

At least one or all silicon atoms of the polysilsesquioxane having at least one reactive functional group substituted therein may be substituted with reactive functional groups described above, further, at least one silicon atom of the polysilsesquioxane having at least one reactive functional group substituted therein may be substituted with a reactive functional group, and furthermore, the silicon atoms in which no reactive functional groups are substituted may be substituted with the unreactive functional groups described above.

As at least one silicon atom of the polysilsesquioxane having at least one reactive functional group substituted therein is substituted with a reactive functional group, the mechanical properties of the coating film or the binder resin formed upon photocuring of the photocurable coating composition may be enhanced. Further, as the remaining silicon atoms are substituted with unreactive functional groups, a steric hindrance appears molecular structurally, which significantly decreases the frequency or probability of exposure of the siloxane bond (—Si—O—) to the outside, and thus it is possible to enhance the alkali resistance of the coating film or the binder resin formed upon photocuring of the photocurable coating composition.

More specifically, when the polysilsesquioxane is substituted with both reactive functional groups and unreactive functional groups, the molar ratio of the reactive functional group to the unfunctional reactive group substituted in the polysilsesquioxane is 0.20 or higher or 0.3 or higher, and may be 0.20 to 6, or 0.3 to 4, or 0.4 to 3. When the ratio between the reactive functional group and the unreactive functional group substituted in the polysilsesquioxane is within the above range, the steric hindrance in the polysilsesquioxane molecule may be maximized, and accordingly, the frequency and probability of exposure of the siloxane bond (—Si—O—) to the outside may be significantly reduced, and the mechanical properties or the alkali resistance of the coating film or the binder resin formed upon photocuring of the photocurable coating composition may be further enhanced.

In addition, when the polysilsesquioxane is substituted with both the reactive functional groups and unreactive functional groups, 100 mol % of the silicon atoms of the polysilsesquioxane having at least one reactive functional group substituted therein may be substituted with a reactive functional group and a nonfunctional reactive group, while satisfying the molar ratio of the reactive functional group to the non-functional reactive group substituted in polysilsesquioxane.

On the other hand, examples of the polyhedral oligomeric silsesquioxane (POSS) having a cage structure in which at least one reactive functional group is substituted therein include POSS in which at least one alcohol is substituted, such as TMP diollsobutyl POSS, cyclohexanediol isobutyl POSS, 1,2-Propanediollsobutyl POSS, octa(3-hydroxy-3 methyl butyldimethylsiloxy) POSS, etc.; POSS in which at least one amine is substituted, such as aminopropyllsobutyl POSS, aminopropyllsooctyl POSS, aminoethylaminopropyl isobutyl POSS, N-phenylaminopropyl POSS, N-methylaminopropyl isobutyl POSS, octaammonium POSS, aminophenylCyclohexyl POSS, aminophenyllsobutyl POSS, etc.; POSS in which at least one carboxylic acid is substituted, such as Maleamic Acid-Cyclohexyl POSS, Maleamic Acid-Isobutyl POSS, Octa Maleamic Acid POSS, etc; POSS in which at least one epoxide is substituted, such as epoxycyclohexylisobutyl POSS, epoxycyclohexyl POSS, glycidyl POSS, glycidylethyl POSS, glycidylisobutyl POSS, glycidylisooctyl POSS, etc.; POSS in which at least one imide is substituted, such as POSS maleimide cyclohexyl, POSS maleimide isobutyl, etc.; POSS in which at least one (meth) acrylate is substituted, such as acrylolsobutyl POSS, (meth) acryllsobutyl POSS, (meth)acrylate cyclohexyl POSS, (meth)acrylate isobutyl POSS, (meth)acrylate ethyl POSS, (meth)acrylethyl POSS, (meth)acrylate isooctyl POSS, (meth)acryllsooctyl POSS, (meth)acrylPhenyl POSS, (meth)acryl POSS, acrylo POSS, etc.; POSS in which at least one nitrile group is substituted, such as cyanopropylisobutyl POSS, etc.; POSS in which at least one norbornene is substituted, such as norbornenylethylEthyl POSS, norbornenylethyllsobutyl POSS, norbornenylethyl disilanoisobutyl POSS, trisnorbornenyl isobutyl POSS, etc.; POSS in which at least one vinyl group is substituted, such as allylisobutyl POSS, monovinylisobutyl POSS, octacyclohexenyldimethylsilyl POSS, octavinyldimethylsilyl POSS, octavinyl POSS, etc.; POSS in which at least one olefin is substituted, such as allylisobutyl POSS, monovinylisobutyl POSS, octacyclohexenyldimethylsilyl POSS, octavinyldimethylsilyl POSS, octavinyl POSS, etc.; POSS in which a PEG having 5 to 30 carbon atoms is substituted; or POSS in which at least one thiol group is substituted, such as Mercaptopropyllsobutyl POSS or Mercaptopropyllsooctyl POSS, etc.

On the other hand, the coating composition having a photocurable property of the one embodiment may include a fluorine-based compound containing a photoreactive functional group. As the fluorine-based compound containing the photoreactive functional group is included, the low refractive index layer and the antireflection film manufactured from the coating composition having a photocurable property may have reduced reflectivity and improved light transmittance, and may further enhance the alkali resistance and scratch resistance.

The fluorine-based compound may include or be substituted with at least one photoreactive functional group, and the photoreactive functional group refers to a functional group which can participate in a polymerization reaction by irradiation of light, for example, by irradiation of visible light or ultraviolet light. The photoreactive functional group may include various functional groups known to be able to participate in a polymerization reaction by irradiation of light. Specific examples thereof include a (meth)acrylate group, an epoxide group, a vinyl group or a thiol group.

The fluorine-based compound containing the photoreactive functional group may have a fluorine content of 1 to 25% by weight. When the content of fluorine in the fluorine-based compound containing the photoreactive functional group is too small, the fluorine component cannot be sufficiently arranged on the surface of the final product obtained from the coating composition having a photocurable property in the above embodiment and thus, it may be difficult to sufficiently secure the physical properties such as alkali resistance. In contrast, when the content of fluorine in the fluorine-based compound containing the photoreactive functional group is too large, the surface characteristics of the final product obtained from the coating composition having a photocurable property in the one embodiment may be decreased, or the incidence rate of defective products may be increased in the subsequent process for obtaining the final product. On the other hand, in order to minimize the problems arising from a peel-off constant voltage which may occur in the subsequent process for producing the final product (for example, a TV or a monitor) to which the antireflection film is applied, the low refractive index layer may include a fluorine-based compound having a photoreactive functional group having a fluorine content of 1 wt % to 25 wt %.

The fluorine-based compound containing the photoreactive functional group may further include silicon or a silicon compound. That is, the fluorine-based compound containing the photoreactive functional group may optionally contain silicon or a silicon compound therein, and specifically, the content of silicon in the fluorine-based compound containing the photoreactive functional group may be 0.1 wt % to 20 wt %.

The silicon contained in the fluorine-based compound containing the photoreactive functional group may serve to increase transparency by preventing the generation of haze in the low refractive index layer obtained from the coating composition having a photocurable property of the embodiment above. On the other hand, if the content of silicon in the fluorine-based compound containing the photoreactive functional group becomes too large, the alkali resistance of the low refractive index layer obtained from the coating composition having a photocurable property of the embodiment above may be reduced.

The fluorine-based compound containing the photoreactive functional group may have a weight-average molecular weight (weight-average molecular weight in terms of polystyrene measured by GPC method) of 2,000 to 200,000. When the weight-average molecular weight of the fluorine-based compound containing the photoreactive functional group is too small, the low refractive index layer obtained from the coating composition having a photocurable property of the embodiment may not have sufficient alkali resistance. Further, when the weight-average molecular weight of the fluorine-based compound containing the photoreactive functional group is too large, the low refractive index layer obtained from the coating composition having a photocurable property of the embodiment above may not have sufficient durability and scratch resistance.

Specifically, the fluorine-based compound containing the photoreactive functional group may be i) an aliphatic compound or an aliphatic cyclic compound in which at least one photoreactive functional group is substituted and at least one fluorine is substituted on at least one carbon; ii) a heteroaliphatic compound or a heteroaliphatic cyclic compound in which at least one photoreactive functional group is substituted, at least one hydrogen is substituted with fluorine, and at least one carbon is substituted with silicon; iii) a polydialkylsiloxane-based polymer (for example, polydimethylsiloxane-based polymer) in which at least one photoreactive functional group is substituted and at least one fluorine is substituted on at least one silicon; iv) a polyether compound in which at least one photoreactive functional group is substituted and at least one hydrogen is substituted with fluorine, or a mixture of two or more of i) to iv), or a copolymer thereof.

The coating composition having a photocurable property may contain 1 to 75 parts by weight of the fluorine-based compound containing the photoreactive functional group based on 100 parts by weight of the photopolymerizable compound. When the fluorine-based compound containing the photoreactive functional group is added in excess relative to the photopolymerizable compound, the coating properties of the composition of the embodiment above may be reduced, or the low refractive index layer obtained from the coating composition having a photocurable property of the embodiment above may not have sufficient durability or scratch resistance. In contrast, when the amount of the fluorine-based compound containing the photoreactive functional group is too small relative to the photopolymerizable compound, the low refractive index layer obtained from the coating composition having a photocurable property of the embodiment above may not have sufficient alkali resistance.

On the other hand, the photopolymerizable compound may include a monomer or an oligomer containing a (meth)acrylate or vinyl group. Specifically, the photopolymerizable compound may include a monomer or an oligomer containing one or more or two or more, or three or more of (meth)acrylates or vinyl groups.

Specific examples of the monomer or oligomer containing (meth)acrylate include, pentaerythritol tri(meth)acrylate, pentaerythritol tetra(meth)acrylate, dipentaerythritol penta(meth)acrylate, dipentaerythritol hexa(meth)acrylate, tripentaerythritol hepta(meth)acrylate, trilene diisocyanate, xylene diisocyanate, hexamethylene diisocyanate, trimethylolpropane tri(meth)acrylate, trimethylolpropane polyethoxy tri(meth)acrylate, trimethylolpropane trimethacrylate, ethylene glycol dimethacrylate, butanediol dimethacrylate, hexaethyl methacrylate, butyl methacrylate, or a mixture of two or more thereof, or urethane-modified acrylate oligomer, epoxide acrylate oligomer, ether acrylate oligomer, dendritic acrylate oligomer, or a mixture of two or more thereof. Herein, the molecular weight of the oligomers is preferably 1,000 to 10,000.

Specific examples of the monomer or oligomer containing a vinyl group include divinylbenzene, styrene, or para-methyl styrene.

The content of the photopolymerizable compound in the coating composition having a photocurable property is not particularly limited. However, considering the mechanical properties of the finally manufactured low refractive index layer and the antireflection film, the content of the photopolymerizable compound in the solid content of the coating composition having a photocurable property may be 20% by weight to 80% by weight. The solid content of the coating composition having a photocurable property refers only to the solid components, excluding the liquid components in the coating composition having a photocurable property, for example, organic solvents, which may be optionally included as described below.

On the other hand, the photopolymerizable compound may further include a fluorine-based (meth)acrylate-based compound in addition to the monomer or oligomer described above. When the fluorine-based (meth)acrylate-based compound is further included, the weight ratio of the fluorine-based (meth)acrylate-based compound to the monomer or oligomer containing a (meth)acrylate or vinyl group may be 0.1% to 10%.

Specific examples of the fluorine-based (meth)acrylate-based compound include at least one compound selected from the group consisting of the following chemical formulae (11) to (15).

[Chemical Formula 11]

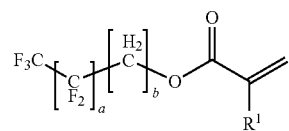

In the above formula 11, $R^1$ is a hydrogen group, or an alkyl group having 1 to 6 carbon atoms, a is an integer of 0 to 7, and b is an integer of 1 to 3.

[Chemical Formula 12]

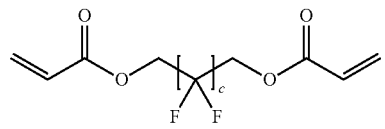

In the above formula 12, c is an integer of 1 to 10.

[Chemical Formula 13]

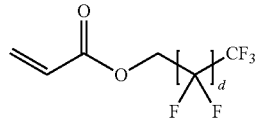

In the above formula 13, d is an integer of 1 to 11.

[Chemical Formula 14]

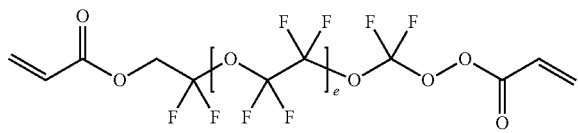

In the above formula 14, e is an integer of 1 to 5.

[Chemical Formula 15]

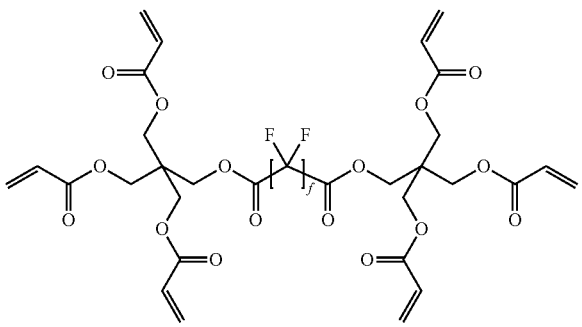

In the above formula 15, f is an integer of 4 to 10.

The coating composition having a photocurable property may include an inorganic fine particle, and may include an inorganic fine particle conventionally known in the art, considering the characteristics of the low refractive index layer or the antireflection film. Herein, the inorganic fine particle refers to an inorganic particle having a diameter of nanometer or micrometer units.

Specifically, the inorganic fine particles may be hollow silica particles having a number average particle diameter of 10 to 100 nm. The hollow silica particles refer to silica particles having voids on the surface and/or inside of the particles. The hollow silica particles may have a refraction index than lower than that of the hollow particles and thus can exhibit excellent antireflection properties.

The hollow silica particles may have a number average particle diameter of 10 to 100 nm, preferably 20 to 70 nm, more preferably 30 to 70 nm; and the shape of the particles is preferably spherical, but it may be amorphous.

In addition, as for the hollow inorganic nanoparticles, hollow inorganic nanoparticles whose surface is coated with a fluorine-based compound may be used either alone or in combination with hollow inorganic nanoparticles whose surface is not coated with a fluorine-based compound. When the surface of the hollow inorganic nanoparticles is coated with a fluorine-based compound, the surface energy may be further reduced. Accordingly, the hollow inorganic nanoparticles may be more uniformly distributed in the coating composition having a photocurable property of the embodiment above, and the durability and scratch resistance of the film obtained from the coating composition having a photocurable property may be further improved.

As a method of coating the surface of the hollow inorganic nanoparticles with a fluorine-based compound, a conventionally known particle coating method, polymerization method, and the like may be used without any limitation. For example, the fluorine-based compound may be bonded to the surface of the hollow inorganic nanoparticles via hydrolysis and a condensation reaction by subjecting the hollow inorganic nanoparticles and the fluorine-based compound to a sol-gel reaction in the presence of water and a catalyst.

Further, the hollow silica particles may be included in the composition in a colloidal phase dispersed in a predetermined dispersion medium. The colloidal phase containing the hollow silica particles may contain an organic solvent as a dispersion medium.

Herein, the hollow silica may include a predetermined functional group substituted on the surface thereof to be more readily dispersed in the organic solvent. Examples of organic functional groups which can be substituted on the surface of the hollow silica particles are not particularly limited, but for example, a (meth) acrylate group, a vinyl group, a hydroxyl group, an amine group, an allyl group, an epoxy group, a hydroxyl group, an isocyanate group, an amine group, or fluorine, etc. may be substituted on the surface of the hollow silica.

The solid content of the hollow silica particles in the colloidal phase of the hollow silica particles may be determined by considering the range of content of the hollow silica in the coating composition having a photocurable property of the one embodiment and the viscosity of the coating composition having the photo-curability, etc., and for example, the solid content of the hollow silica particles in the colloidal phase may range from 5% by weight to 60% by weight.

Herein, examples of the organic solvent in the dispersion medium include alcohols such as methanol, isopropyl alcohol, ethylene glycol and butanol, etc.; ketones such as methyl ethyl ketone and methyl isobutyl ketone, etc.; aromatic hydrocarbons such as toluene and xylene, etc.; amides such as dimethylformamide, dimethylacetamide and N-methylpyrrolidone; etc.; esters such as ethyl acetate, butyl acetate and gamma-butylolactone, etc; ethers such as tetrahydrofuran and 1,4-dioxane, etc.; or a mixture thereof.

The photocurable coating composition for preparing the low refractive index layer may include 10 to 320 parts by weight or 50 to 200 parts by weight of the hollow silica particles based on 100 parts by weight of the photopolymerizable compound. When the hollow particles are added in excess, the scratch resistance and abrasion resistance of the coating film may be reduced due to a decrease in the content of the binder.

On the other hand, any compound known to be usable in the photocurable resin composition may be used as the photopolymerization initiator without particular limitation. Specifically, a benzophenone-based compound, an acetophenone-based compound, a biimidazole-based compound, a triazine-based compound, an oxime-based compound, or a mixture of two or more thereof may be used.

The photopolymerization initiator may be used in an amount of 0.1 to 100 parts by weight based on 100 parts by weight of the photopolymerizable compound. When the amount of the photopolymerization initiator is too small, the photocurable coating composition may be uncured in the photocuring step and thus residual substances may appear. In contrast, when the amount of the photopolymerization initiator is too large, the unreacted initiator may remain as an impurity or the crosslinking density may be reduced, which in turn may deteriorate the mechanical properties of the manufactured film or significantly or increase the reflectivity.

On the other hand, the coating composition having a photocurable property may further include an organic solvent.

Non-limiting examples of the organic solvent include ketones, alcohols, acetates and ethers, or mixtures of two or more thereof.

Specific examples of the organic solvent include ketones such as methyl ethyl ketone, methyl isobutyl ketone, acetylacetone or isobutyl ketone, etc.; alcohols such as methanol, ethanol, n-propanol, i-propanol, n-butanol, i-butanol or t-butanol, etc.; acetates such as ethyl acetate, i-propyl acetate, or polyethylene glycol monomethyl ether acetate, etc.; ethers such as tetrahydrofuran or propylene glycol monomethyl ether, etc.; or a mixture of two or more thereof.

The organic solvent may be added at the time of mixing the respective components to be included in the coating composition having a photocurable property, or may be included in the coating composition having a photocurable property as the respective components are added to the organic solvent in a dispersed or mixed state. When the content of the organic solvent in the coating composition having a photocurable property is too small, the flowability of the coating composition having a photocurable property may be reduced, resulting in a defect such as generation of streaks in the finally manufactured film. Further, when the organic solvent is added in an excessive amount, the solid content is lowered, and the coating and film formation are not sufficient, so that the physical properties or the surface characteristics of the film may be reduced, and defects may occur during the drying and curing processes. Accordingly, the coating composition having a photocurable property may include the organic solvent such that the concentration of the total solid content of the components contained therein may be 1% by weight to 50% by weight or 2% by weight to 20% by weight.

On the other hand, the antireflection film may be obtained by coating the hard coating composition onto one side of a substrate, and drying and photocuring the same, followed by coating a photocurable coating composition for forming a low refractive index layer on the formed hard coating layer formed and then photocuring the coated product. Herein, the hard coating layer may be semi-cured, and a method of performing a final curing when curing the low refractive index layer is most preferable.

The specific type and thickness of the substrate are not particularly limited, and any substrate known to be usable in the production of a low refractive index layer or the antireflection film may be used without particular limitation. For example, cellulose films such as triacetylcellulose (TAC) film, diacetylcellulose film, acetylpropylcellulose film, and acetylbutylcellulose film, etc.; polyester films such as polyethylene terephthalate film and polyethylene naphthalate film, etc.; polyvinyl acetate films; polycarbonate films; polysulfone films; polyacryl films; polyamide films; polystyrene films; or retardation films may be used, but is not limited thereto.

A method and apparatus conventionally used for applying the photocurable coating composition may be used without particular limitation, and for example, a bar coating method such as Meyer bar, a gravure coating method, a 2-roll reverse coating method, a vacuum slot die coating method, and 2 roll coating method, etc. may be used.

In the step of photocuring the coating composition having a photocurable property, ultraviolet rays or visible rays having a wavelength of 200 to 400 nm may be irradiated, and an exposure amount during irradiation may preferably be 100 to 4,000 mJ/cm$^2$. The exposure time is not particularly limited, and may be appropriately adjusted depending on the exposure apparatus used, the wavelength of the irradiation light, or the exposure amount.

In addition, in the step of photocuring the coating composition having a photocurable property, nitrogen purging, etc. may be performed to prevent the initiator from being decomposed by oxygen.

On the other hand, the finally dried hard coating layer may have a thickness of greater than 5 μm and less than 10 μm. When the thickness of the hard coating layer is 5 μm or less, organic particles or inorganic particles are aggregated, which may result in the appearance of irregularly distributed peaks whose height is large on the surface of the antireflection film. In contrast, when the thickness of the hard coating layer is 10 μm or higher, there may be a disadvantage in that cracks may easily occur when handling the coating film.

Herein, the low refractive index layer may have a thickness of 1 nm to 300 nm or 50 nm to 200 nm. By adjusting the thickness of the hard coating layer and the low refractive index layer to be in the range described above, it is possible to adjust the volume parameter within the range described above, thereby enhancing the sharpness of the image while maintaining the antiglare function of the antireflection film.

On the other hand, according to another embodiment of the invention, there may be provided a display device including the antireflection film described above.

The display device may be a liquid crystal display device including a pair of polarizing plates facing each other; a thin film transistor, a color filter, and a liquid crystal cell sequentially stacked between the pair of polarizing plates; and a backlight unit.

FIGS. 1a and 1b show a schematic structure of a general TFT display device and a COT panel display device equipped with the antireflection film according to on embodiment of the present invention, respectively.

Further, instead of the structures shown in FIGS. 1a and 1b, a structure in which the antireflection film is equipped between the polarizing plate and the backlight unit may also be possible.

Advantageous Effects

According to the present invention, there may be provided an antireflection film having reduced sparkling phenomenon and excellent visibility when applied to a high-resolution display and having excellent workability during the production of a display, and a display device providing optical characteristics, such as excellent external black visibility and contrast ratio, and high screen sharpness.

The antireflection film is applied to a high-resolution display, thereby providing a high hiding power of a panel defect and excellent antireflection performance and visibility. In particular, it may be applied to a COT panel having a high inner panel reflectivity to express the antireflection performance.

BRIEF DESCRIPTION OF DRAWINGS

FIG. 1a schematically shows a cross section of a general TFT display device equipped with the antireflection film of Example 1.

FIG. 1b schematically shows a cross section of a COT panel display device equipped with the antireflection film of Example 1.

FIG. 2 is an optical microscopic image of the surface of the antireflection film prepared in Example 1 (reflection mode, magnification: 20×).

FIG. 3 is an optical microscopic image of the surface of the antireflection film prepared in Comparative Example 3 (reflection mode, magnification: 10×).

DETAILED DESCRIPTION OF THE EMBODIMENTS

Specific embodiments of the present invention will be described in more detail by way of Examples. However, the Examples are for illustrative purposes only, and the disclosure of the specific embodiments of the invention is not intended to be limited by these Examples.

Preparation Examples: Preparation of Hard Coating Composition and Photocurable Coating Composition for Forming Low Refractive Index Layer (1) Preparation of Hard Coating Composition A hard coating composition was prepared by uniformly mixing the components of Table 1 below. The contents of all components used in Table 1 are expressed in the unit of g. Further, in Table 1, the sum of particles refers to the sum of organic fine particles and inorganic nanoparticles.

particle diameter of 2 μm and a refractive index of 1.555, Techpolymer, manufactured by Sekisui Plastic.

10) Silica 1: Silica particles having a volume average particle size of 100 nm, X24-9600A, manufactured by Shinetsu.

11) Silica 2 Dispersion liquid: Dispersion liquid of nano-silica having a volume average particle diameter of 12 nm which is dispersed in methanol at a ratio of 30 wt %, MA-ST, manufactured by Nissan Chemical.

(2) Preparation of Photocurable Coating Composition for Forming Low Refractive Index Layer.

The components in Table 2 were mixed and diluted to a solid content of 5 wt % in a 1:1 mixed solution (weight ratio) of methyl isobutyl ketone (MIBK) and diacetone alcohol (DAA) to prepare a photocurable coating composition for forming a low refractive index layer. The contents of all components used in Table 2 are expressed in the unit of g.

TABLE 1

|  |  | Preparation Example 1 | Preparation Example 2 | Preparation Example 3 | Preparation Example 4 | Comparative Preparation Example 1 | Comparative Preparation Example 2 | Comparative Preparation Example 3 |
|---|---|---|---|---|---|---|---|---|
| Binder | UA-306T | 4.247 | 4.804 | 4.434 | 4.260 | 4.883 | 4.790 | 4.426 |
|  | 8BR-500 | 7.964 | 8.948 | 6.771 | 7.999 | 9.155 | 8.993 | 8.223 |
|  | TMPTA | 19.720 | 22.161 | 12.313 |  | 22.671 |  |  |
|  | PETA |  |  | 11.084 | 19.806 |  | 22.269 | 20.234 |
| Initiator | I184 | 2.036 | 2.537 | 2.337 | 2.045 | 2.302 | 2.299 | 2.278 |
| Leveling agent | BYK-300 | 0.214 | 0.270 | 0.250 | 0.215 | 0.289 | 0.242 | 0.253 |
| Solvent | IPA | 32.547 | 40.058 | 61.564 | 32.689 | 60.438 | 30.250 | 63.233 |
|  | EtOH | 32.146 | 20.024 |  | 32.286 |  | 30.250 |  |
| Organic fine particles | Fine particle 1 | 0.375 | 0.999 | 0.739 | 0.538 | 0.175 | 0.605 | 1.266 |
| Inorganic nano particles | Silica 1 | 0.536 |  | 0.310 |  |  |  |  |
|  | Silica 2 Dispersion liquid | 0.214 | 0.200 | 0.200 | 0.161 | 0.087 | 0.302 | 0.087 |
| Sum |  | 100.0 | 100.0 | 100.0 | 100.0 | 100.0 | 100.0 | 100.0 |
| Solid content (wt %) |  | 35.306 | 39.919 | 38.437 | 35.024 | 39.562 | 39.500 | 36.767 |
| Sum of binders (wt %) |  | 31.931 | 35.913 | 34.601 | 32.065 | 36.709 | 36.052 | 32.883 |
| Content of silica 2 in dispersion liquid 0536 (g) |  | 0.064 | 0.060 | 0.060 | 0.048 | 0.026 | 0.091 | 0.026 |
| Sum of particles (wt %) |  | 0.975 | 1.059 | 1.109 | 0.586 | 0.201 | 0.696 | 1.292 |
| Weight of silica 2 relative to total particle weight (wt %) |  | 6.583 | 5.666 | 5.410 | 8.238 | 12.979 | 13.025 | 2.020 |

1) PETA: Pentaerythritol triacrylate (molecular weight of 298 g/mol)

2) TMPTA: Trimethylolpropane triacrylate (molecular weight of 296 g/mol)

3) 8BR-500: Urethane-based acryl oligomer, molecular weight of 250,000 g/mol, manufactured by Taisei Fine Chemical.

4) UA-306T: Urethane-based acryl oligomer, molecular weight 1,000 g/mol, manufactured by Kyoeisha.

5) I184 (Irgacure 184): Photoinitiator, manufactured by Ciba.

6) BYK-300: Leveling agent, manufactured by Tego.

7) IPA (Isopropyl alcohol)

8) EtOH (Ethyl alcohol)

9) Fine particle 1: Acryl-styrene copolymer resin, which is a spherical organic fine particle having a volume average

TABLE 2

|  | Preparation Example 5 | Reference Preparation Example 1 |
|---|---|---|
| Dipentaerythritol pentaacrylate | 39 | 42 |
| THRULYA 4320 | 220 | 220 |
| RS907 | 26.7 | 0 |
| EP0408 | 3 | 3 |
| Irgacure-184 | 6 | 6 |

1) Dipentaerythritol pentaacrylate, molecular weight of 524.51 g/mol, manufactured by Kyoeisha.

2) THRULYA 4320: Hollow silica dispersion liquid, solid content of 20 wt % in MIBK solvent, manufactured by Catalysts and Chemicals Ltd.

3) RS907: Fluorine-based compound containing a photoreactive functional group, diluted to a solid content of 30% by weight in MIBK solvent, manufactured by DIC.

4) EP0408: Polysilsesquioxane, manufactured by Hybrid Plastics.

Examples and Comparative Examples: Preparation of Antireflection Film

As shown in Table 3 below, the hard coating composition prepared in each of Preparation Examples above was coated onto a triacetylcellulose (TAC) film with Meyer Bar, dried at 90° C. for 1 minute, and irradiated with ultraviolet rays of 150 mJ/cm$^3$ to prepare a hard coating layer.

Thereafter, the resin composition for preparing a low refractive index layer prepared in Preparation Example above was coated onto the hard coating layer with Meyer Bar #3 and dried at 90° C. for 1 minute. The thus-dried product was irradiated with ultraviolet rays of 180 mJ/cm$^2$ under nitrogen purging to prepare a low refractive index layer having a thickness of 110 nm and subsequently, an anti-glare/anti-reflection film was prepared.

2. Measurement of the Sum of the Volume of the Convex Portion of the Peak Equal to or Higher than the Average Line and the Sum of the Volume of the Concave Portion of the Valley Equal to or Less than the Average Line of Antireflection Film The sum of the volume of the convex portion of the peak equal to or higher than the average line and the sum of the volume of the concave portion of the valley equal to or less than the average line of the surface of the hard coating layer were measure using a white light three-dimensional optical interference profile (3D optical profiler, Model: NewView 7300, manufactured by Zygo). Herein, the area of 1.40×1.05 mm$^2$ was measured under the conditions of 10× magnification of a lens and 0.5× magnification of software zoom.

The thus-prepared antireflection film was placed in a flat state on a sample stage, and after obtaining an optical profiler image, an analysis was conducted. Herein, the sum of the volume of the convex portion of the peak equal to or higher than the average line and the sum of the volume of the concave portion of the valley equal to or less than the average line in the surface area of 1.47 mm$^2$ were each measured.

TABLE 3

| | Example 1 | Example 2 | Example 3 | Example 4 | Comparative Example 1 | Comparative Example 2 | Comparative Example 3 | Comparative Example 4 | Comparative Example 5 | Reference Example 1 |
|---|---|---|---|---|---|---|---|---|---|---|
| Thickness of TAC film (μm) | 60 | 60 | 60 | 60 | 60 | 60 | 60 | 60 | 60 | 60 |
| Composition for hard coating layer | Preparation Example 1 | Preparation Example 2 | Preparation Example 3 | Preparation Example 4 | Preparation Example 1 | Preparation Example 2 | Comparative Preparation Example 1 | Comparative Preparation Example 2 | Comparative Preparation Example 3 | Preparation Example 1 |
| Thickness of hard coating layer (μm) | 7 | 7 | 7 | 6 | 4 | 4 | 7 | 6 | 6 | 7 |
| Composition for low refractive index layer | Preparation Example 5 | Preparation Example 5 | Preparation Example 5 | Preparation Example 5 | Preparation Example 5 | Preparation Example 5 | Preparation Example 5 | Preparation Example 5 | Preparation Example 5 | Reference Preparation Example 1 |

Experimental Example: Measurement of Physical Properties of Hard Coating Layer and Antireflection Film The physical properties of the hard coating layers prepared above and the physical properties of the antireflection films including the same were measured according to the following methods and are shown in Table 4.

1. Measurement of Internal Haze and External Haze of Antireflection Film

The total haze of the antireflection film is the sum of the internal haze and the external haze. After measuring the total haze and the internal haze by the following method, the external haze may be obtained by the difference between the total haze and the internal haze. Specifically, the transmittance was measured three times according to JIS K 7361 standard, and the haze was measured three times according to JIS K 7105 standard using a haze meter (HM-150, A light source, manufactured by Murakami), and then the average value of each measurement was calculated to obtain the total haze. Further, in order to make the surface of the coating layer flat, an adhesive having a haze of 0 was applied to the surface so that external irregularities were embedded in the adhesive, and then the haze was measured three times with the haze meter, and the average value was calculated to obtain the internal haze. Thereafter, the external haze value was obtained by subtracting the internal haze value from the total haze value.

3. Measurement of Average Reflectivity of Antireflection Film

The average reflectivity was measured using SolidSpec 3700 manufactured by SHIMADZU.

Specifically, a black tape (3M) was attached to the surface of the substrate film on which no hard coating layer was formed to prevent light from being transmitted, and the measurement conditions were fixed to a sampling interval of 1 nm, time constant of 0.1 second, slit width of 20 nm with a medium scanning speed. Thereafter, a light in the wavelength region of 380 nm to 780 nm was irradiated to the antireflection film at room temperature by applying 100T mode to measure the reflectivity.

4. Measurement of Gloss of Antireflection Film

The gloss at 20° and 60° angles was measured using micro-TRI-gloss manufactured by BYK Gardner.

Specifically, a black tape (vinyl tape 472 black, manufactured by 3M) was attached to the surface of the substrate film on which no hard coating layer was formed to prevent light from being transmitted, and the incidence angle of light was defined as the average value of data measured at least 5 times at 20° and 60° angles.

5. Measurement of Scratch Resistance

The surface of the antireflection films obtained in Examples and Comparative Examples were rubbed back and forth 10 times with a steel wool (#0000) under a load at a speed of 27 rpm. The scratch resistance was evaluated by confirming the maximum load at which a scratch of 1 cm or less observed with the naked eye was 1 or less.

6. Evaluation of Defective Irregularities of Antireflection Film

In order to confirm the presence or absence of defective irregularities of the antireflection films prepared in Examples and Comparative Examples, a black tape (vinyl tape 472 black, manufactured by 3M) was attached to the surface of the antireflection film on which no hard coating layer was formed to prevent light from being transmitted, and then a reflection image was photographed using an optical microscope (BX-51, manufactured by Olympus). The photographed image was in the size of 640×480 pixels, and the magnification may be selected from 10× or 20×. The amount of light was adjusted within the range of 50% to 100% of the maximum amount of light emerging from the optical microscope.

The presence or absence of rainbow stains which exist on the surface of the antireflection film was observed in the used images and evaluated according to the following criteria. If such a rainbow stain is present in the antireflection film, it may lead to the occurrence of a defective pixel in the subsequent process, and thus it is preferred that the rainbow stains do not exist. The optical microscopic images of the antireflection films of Example 1 and Comparative Example 3 in the evaluation results are shown in FIGS. 2 and 3, respectively.

<Measurement Criteria> x: No rainbow stain exists.

Δ: 1 to 3 rainbow stains exist (at magnification of 20×).

○: More than 3 rainbow stains exist (at magnification of 20×).

in which the content of nanosilica (inorganic nanoparticles) having a diameter of 12 nm in the composition for a hard coating layer is too large or small, did not satisfy the range of the volume parameter of the present invention.

On the other hand, it can be confirmed that the antireflection film of the Examples could exhibit a low external haze, and at the same time secure improved scratch resistance, while simultaneously satisfying both the sum of the volume of the convex portion of the peak equal to or higher than the average line of less than 0.03 mm$^3$; and the sum of the volume of the concave portion of the valley equal to or less than the average line of less than 0.03 mm$^3$.

Further, in the case of Reference Example 1 having the composition for a low refractive index layer which does not simultaneously include a fluorine-based compound containing a photoreactive functional group and polysilsesquioxane having at least one reactive functional group substituted therein, it was confirmed that it satisfied the range of the volume parameter of the present invention, but the scratch resistance was reduced compared to that in the Examples.

Furthermore, with reference to FIGS. 2 and 3, the antireflection films of the Examples having such physical properties as above showed a uniform surface concavo-convex shape, and unlike the antireflection films of the Comparative Examples, there existed no rainbow stains, and thus a liquid crystal display device without defective pixels can be implemented.

What is claimed is:

1. An antireflection film comprising:

a hard coating layer; and a low refractive index layer formed on the hard coating layer,

TABLE 4

| | Example 1 | Example 2 | Example 3 | Example 4 | Comparative Example 1 | Comparative Example 2 | Comparative Example 3 | Comparative Example 4 | Comparative Example 5 | Reference Example 1 |
|---|---|---|---|---|---|---|---|---|---|---|
| Composition for hard coating layer | Preparation Example 1 | Preparation Example 2 | Preparation Example 3 | Preparation Example 4 | Preparation Example 1 | Preparation Example 2 | Comparative Preparation Example 1 | Comparative Preparation Example 2 | Comparative Preparation Example 3 | Preparation Example 1 |
| Thickness of hard coating layer (μm) | 7 | 7 | 7 | 6 | 4 | 4 | 7 | 6 | 6 | 7 |
| Composition for low refractive index layer | Preparation Example 5 | Preparation Example 5 | Preparation Example 5 | Preparation Example 5 | Preparation Example 5 | Preparation Example 5 | Preparation Example 5 | Preparation Example 5 | Preparation Example 5 | Reference Preparation Example 1 |
| Total haze (%) | 2.4 | 2.3 | 2.5 | 2.3 | 2.6 | 2.0 | 0.8 | 3.1 | 2.9 | 2.7 |
| Internal haze (%) | 2.2 | 2.2 | 2.4 | 2.2 | 2.0 | 1.6 | 0.3 | 2.4 | 2.3 | 2.6 |
| External haze (%) | 0.2 | 0.1 | 0.1 | 0.1 | 0.6 | 0.4 | 0.5 | 0.7 | 0.6 | 0.1 |
| Gloss (20°/60°) | 29.2/51.2 | 26.5/52.0 | 26.9/52.2 | 27.1/52.2 | 30.2/51.8 | 26.5/52.4 | 26.5/50.9 | 28.2/53.1 | 27.6/52.9 | 30/51.1 |
| Average reflectivity (%) | 1.28 | 1.27 | 1.28 | 1.28 | 1.27 | 1.28 | 1.28 | 1.26 | 1.27 | 1.52 |
| Sum of the volume of the convex portion (mm$^3$) | 0.022 | 0.021 | 0.021 | 0.023 | 0.039 | 0.047 | 0.039 | 0.042 | 0.041 | 0.019 |
| Sum of the volume of the concave portion (mm$^3$) | 0.023 | 0.019 | 0.021 | 0.022 | 0.037 | 0.047 | 0.039 | 0.041 | 0.040 | 0.022 |
| Existence of rainbow stains | x | x | x | x | ○ | ○ | Δ | ○ | ○ | Δ |
| Scratch resistance (g) | 350 | 350 | 350 | 350 | 350 | 350 | 350 | 350 | 350 | 150 |

As can be seen in Table 4, it was confirmed that, even when the same composition for a hard coating layer was used, the antireflection films (Comparative Examples 1 and 2) having a thickness of the hard coating layer of 5 m or less, and the antireflection films (Comparative Examples 3 to 5), wherein the antireflection film has a surface concavo-convex structure having a peak with a convex portion and a valley with a concave portion, and wherein the sum of the volume of the convex portion of the peak equal to or higher than an average line is greater than 0 and less than 0.03 mm³ in a surface area of 1.47 mm², and the sum of the volume of the concave portion of the valley equal to or higher than an average line is greater than 0 and less than 0.03 mm³ in a surface area of 1.47 mm².

2. The antireflection film of claim 1, wherein the sum of the volume of the convex portion of the peak equal to or higher than the average line and the sum of the volume of the concave portion of the valley equal to or lower than the average line are the results measured by a non-contact surface shape measuring instrument (3D optical profiler), respectively.

3. The antireflection film of claim 1, wherein an average reflectivity of the antireflection film is less than 5% in a wavelength range of 380 nm to 780 nm.

4. The antireflection film of claim 1, wherein the internal haze of the antireflection film is greater than 0 and less than 10%.

5. The antireflection film of claim 1, wherein the external haze of the antireflection film is greater than 0 and less than 0.5%.

6. The antireflection film of claim 1, wherein the hard coating layer comprises a binder resin containing a (co)polymer of a photopolymerizable compound and an organic or inorganic fine particle dispersed in the binder resin.

7. The antireflection film of claim 6, wherein the hard coating layer comprises 0.1 to 20 parts by weight of the organic or inorganic fine particles based on 100 parts by weight of the (co)polymer of the photopolymerizable compound.

8. The antireflection film of claim 6, wherein the hard coating layer further comprises 3 to 10% by weight of inorganic nanoparticles having a diameter of 1 nm to 50 nm based on the total weight of the organic or inorganic fine particles and inorganic nanoparticles.

9. The antireflection film of claim 8, wherein the hard coating layer further comprises an inorganic nanoparticle having a diameter greater than 50 nm, and a diameter less than or equal to 120 nm.

10. The antireflection film of claim 1, wherein the low refractive index layer comprises a binder resin including a cross-linked polymer between a photopolymerizable compound; a fluorine-based compound containing a photoreactive functional group; and a polysilsesquioxane in which at least one reactive functional group is substituted, and an inorganic fine particle dispersed in the binder resin.

11. The antireflection film of claim 10, wherein the reactive functional group substituted on the polysilsesquioxane comprises at least one functional group selected from the group consisting of alcohols, amines, carboxylic acids, epoxides, imides, (meth)acrylates, nitriles, norbornenes, olefins, polyethylene glycols, thiols, and vinyl groups.

12. The antireflection film of claim 11, wherein the polysilsesquioxane in which at least one reactive functional group is substituted is further substituted with at least one unreactive functional group selected from the group consisting of a linear or branched alkyl group having 1 to 30 carbon atoms, a cycloalkyl group having 6 to 30 carbon atoms, and an aryl groups having 6 to 30 carbon atoms.

13. The antireflection film of claim 10,
wherein the polysilsesquioxane in which at least one reactive functional group is substituted comprises a polyhedral oligomeric silsesquioxane having a cage structure, in which at least one reactive functional group is substituted, and
wherein at least one of the silicon atoms of the polyhedral oligomeric silsesquioxane having a cage structure is substituted with a reactive functional group, and the remaining silicon atoms, in which a reactive functional group is not substituted, are substituted with an unreactive functional group.

14. The antireflection film of claim 13, wherein the molar ratio of the reactive functional group to the unreactive functional group substituted on the polysilsesquioxane is 0.20 or more.

15. The antireflection film of claim 10, wherein the photoreactive functional group included in the fluorine-based compound is at least one selected from the group consisting of (meth)acrylate group, epoxide group, vinyl group, and thiol group.

16. The antireflection film of claim 10,
wherein the fluorine-based compound containing a photoreactive functional group has a fluorine content of 1% by weight to 25% by weight and includes at least one selected from the group consisting of i) an aliphatic compound or an aliphatic cyclic compound in which at least one photoreactive functional group is substituted and at least one fluorine is substituted on at least one carbon; ii) a heteroaliphatic compound or a heteroaliphatic cyclic compound in which at least one photoreactive functional group is substituted, at least one hydrogen is substituted with fluorine, and at least one carbon is substituted with silicon; iii) a polydialkylsiloxane-based polymer in which at least one photoreactive functional group is substituted and at least one fluorine is substituted on at least one silicon; and iv) a polyether compound in which at least one photoreactive functional group is substituted and at least one hydrogen is substituted with fluorine.

17. The antireflection film of claim 10,
wherein the inorganic fine particles are hollow silica particles having a number average particle diameter of 10 nm to 100 nm.

18. The antireflection film of claim 10,
wherein the low refractive index layer comprises 1 to 75 parts by weight of the fluorine-based compound containing a photoreactive functional group, 0.5 to 25 parts by weight of the polysilsesquioxane in which at least one reactive functional group is substituted, and 10 to 320 parts by weight of the inorganic fine particles based on 100 parts by weight of the photopolymerizable compound.

19. The antireflection film of claim 1,
wherein the hard coating layer has a thickness of greater than 5 μm and less than 10 μm, and the low refractive index layer has a thickness of 1 nm to 300 nm.

20. A display device comprising the antireflection film according to claim 1.

* * * * *